(12) United States Patent
Yu et al.

(10) Patent No.: US 9,305,346 B2
(45) Date of Patent: Apr. 5, 2016

(54) METHOD AND APPARATUS FOR EFFICIENT DEFECT INSPECTION

(75) Inventors: Ching-Fang Yu, Hsinchu (TW); Ting-Hao Hsu, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 695 days.

(21) Appl. No.: 13/484,968

(22) Filed: May 31, 2012

(65) Prior Publication Data

US 2013/0322736 A1 Dec. 5, 2013

(51) Int. Cl.
*G06T 7/00* (2006.01)

(52) U.S. Cl.
CPC ....... *G06T 7/001* (2013.01); *G06T 2207/10061* (2013.01); *G06T 2207/30148* (2013.01)

(58) Field of Classification Search
CPC ... G06F 17/5045; G06F 17/5081; G06F 1/84; G06T 2207/30148; G06T 7/0006; G06T 7/0028; G06T 7/001; G06T 2207/10061
USPC ......................................... 382/141, 149, 152
See application file for complete search history.

(56) References Cited

U.S. PATENT DOCUMENTS

| | | | |
|---|---|---|---|
| 5,774,573 A * | 6/1998 | Caspi et al. | 382/141 |
| 7,676,077 B2 * | 3/2010 | Kulkarni et al. | 382/144 |
| 7,808,629 B2 | 10/2010 | Lim et al. | |
| 2007/0233419 A1 * | 10/2007 | Pack et al. | 702/127 |
| 2007/0248257 A1 * | 10/2007 | Bruce et al. | 382/144 |
| 2008/0212869 A1 * | 9/2008 | Yoshikawa et al. | 382/144 |
| 2013/0279791 A1 * | 10/2013 | Kaizerman et al. | 382/145 |

OTHER PUBLICATIONS

Unpublished U.S. Appl. No. 13/455,584, filed Apr. 25, 2012, entitled "Method and Apparatus for Defect Identification", 29 pages.

* cited by examiner

*Primary Examiner* — Edward Park
(74) *Attorney, Agent, or Firm* — Haynes and Boone, LLP

(57) ABSTRACT

A method of inspecting fabricated articles includes receiving a fabricated article to be inspected for defects, the fabricated article having a pattern thereon, and the pattern being based on a pattern design and creating a rule set for defining critical regions of the pattern as represented in the pattern design, the critical regions being regions in which defects are more likely to be found during inspection. The method also includes applying the rule set to the pattern design to identify a critical region of the pattern on the fabricated article and a non-critical region of the pattern on the fabricated article. Further, the method includes inspecting the non-critical region of the pattern on the fabricated article for defects at first resolution and inspecting the critical region of the pattern on the fabricated article for defects at a second resolution higher than the first resolution.

14 Claims, 11 Drawing Sheets

METHOD AND APPARATUS FOR EFFICIENT DEFECT INSPECTION

BACKGROUND

The semiconductor integrated circuit (IC) industry has experienced rapid growth. In the course of IC evolution, functional density (i.e., the number of interconnected devices per chip area) has generally increased while geometry size (i.e., the smallest component (or line) that can be created using a fabrication process) has decreased. This scaling down process generally provides benefits by increasing production efficiency and lowering associated costs. Such scaling down has also increased the complexity of processing and manufacturing ICs and, for these advances to be realized, similar developments in IC manufacturing are needed.

For example, in semiconductor technologies, a plurality of photomasks (masks) are formed with predesigned IC patterns. The plurality of masks are used during lithography processes to transfer the predesigned IC patterns to multiple semiconductor wafers. The predesigned IC patterns formed on the masks are master patterns. Accordingly, any photomask defects will be transferred to multiple semiconductor wafers, causing yield issues. High precision processes are therefore utilized during mask fabrication, and fabricated masks are inspected for defects after mask fabrication. Conventional mask inspections may be performed with a number of different inspection tools including optical inspection systems and scanning electron microscope systems such as electron-beam (e-beam) inspection tools. Each of these imaging systems produce images of defects on photomasks, but they may have some drawbacks. For instance, optical inspection systems may not produce images with high enough resolution to detect all photomask defects, and e-beam inspection systems may have too low of a throughput for efficient mask inspection flow. Thus, although existing approaches have been satisfactory for their intended purposes, they have not been entirely satisfactory in all respects.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
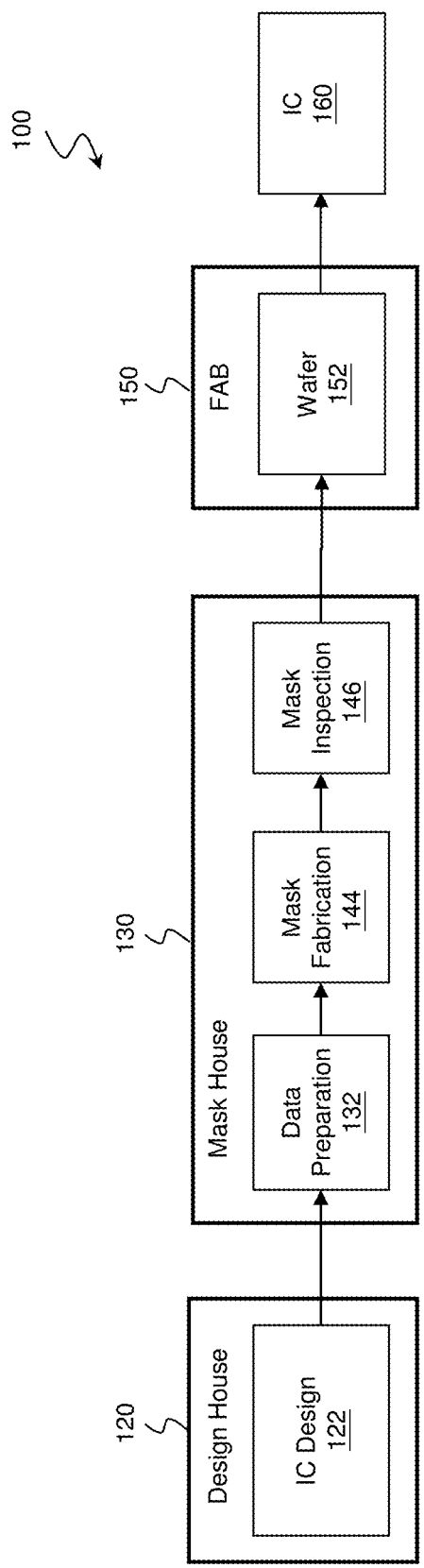
FIG. 1 is a simplified block diagram of an embodiment of an integrated circuit (IC) manufacturing system and an associated IC manufacturing flow.

It is understood that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a simplified block diagram of an embodiment of an integrated circuit (IC) manufacturing system 100 and an IC manufacturing flow associated with the IC manufacturing system. The IC manufacturing system 100 includes a plurality of entities, such as a design house 120, a mask house 130, and an IC manufacturer 150 (i.e., a fab), that interact with one another in the design, development, and manufacturing cycles and/or services related to manufacturing an integrated circuit (IC) device 160. The plurality of entities are connected by a communications network, which may be a single network or a variety of different networks, such as an intranet and the Internet, and may include wired and/or wireless communication channels. Each entity may interact with other entities and may provide services to and/or receive services from the other entities. The design house 120, mask house 130, and IC manufacturer 150 may be a single entity or separate entities.

The design house (or design team) 120 generates an IC design layout 122. The IC design layout 122 includes various geometrical patterns designed for an IC product, based on a specification of the IC product to be manufactured. The geometrical patterns correspond to patterns of metal, oxide, or semiconductor layers that make up the various components of the IC device 160 to be fabricated. The various layers combine to form various IC features. For example, a portion of the IC design layout 122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. The design house 120 implements a proper design procedure to form the IC design layout 122. The design procedure may include logic design, physical design, and/or place and route. The IC design layout 122 is presented in one or more data files having information of the geometrical patterns. For example, the IC design layout 122 can be expressed in a GDSII file format (or DFII file format).

The mask house 130 uses the IC design layout 122 to manufacture one or more masks to be used for fabricating the various layers of the IC product according to the IC design layout 122. The mask house 130 performs mask data preparation 132, where the IC design layout 122 is translated into a form that can be physically written by a mask writer. Data preparation 132 may include optical proximity correction (OPC) and a lithography process check (LPC) to compensate for image errors and simulate mask fabrication. The mask house 130 also performs mask fabrication 144, where the design layout prepared by the mask data preparation 132 is modified to comply with a particular mask writer and/or mask manufacturer and is then fabricated. In the present embodiment, the mask data preparation 132 and mask fabrication 144 are illustrated as separate elements, however, the mask data preparation 132 and mask fabrication 144 can be collectively referred to as mask data preparation.

During mask fabrication 144, a mask or group of masks are fabricated based on the modified IC design layout. For example, an electron-beam (e-beam) or a mechanism of multiple e-beams is used to form a pattern on a mask (photomask or reticle) based on the modified IC design layout. The mask can be formed in various technologies. In one embodiment, the mask is formed using binary technology. In the present embodiment, a mask pattern includes opaque regions and transparent regions. A radiation beam, such as an ultraviolet (UV) beam, used to expose the image sensitive material layer (e.g., photoresist) coated on a wafer, is blocked by the opaque region and transmits through the transparent regions. In one example, a binary mask includes a transparent substrate (e.g., fused quartz) and an opaque material (e.g., chromium) coated in the opaque regions of the mask. In another example, the mask is formed using a phase shift technology. In the phase shift mask (PSM), various features in the pattern formed on the mask are configured to have proper phase difference to enhance the resolution and imaging quality. In various examples, the phase shift mask can be attenuated PSM or alternating PSM as known in the art.

After a mask has been fabricated, the mask house performs a mask inspection 146 to determine if the fabricated mask includes any defects, such as full-height and non-full-height defects. If any defects are detected, the mask may be cleaned or the IC design may be modified further depending on the types of defects detected.

It should be understood that the above description of the mask data preparation 132 has been simplified for the purposes of clarity, and data preparation may include additional features such as a logic operation (LOP) to modify the IC design layout according to manufacturing rules, a retarget process (RET) to modify the IC design layout to compensate for limitations in lithographic processes used by IC manufacturer 150, and a mask rule check (MRC) to modify the IC design layout to compensate for limitations during mask fabrication 144. Additionally, the processes applied to the IC design layout 122 during mask fabrication 144 and mask inspection 146 may be executed in a variety of different orders and may include a variety of different and/or additional steps.

The IC manufacturer 150, such as a semiconductor foundry, uses the mask (or masks) fabricated by the mask house 130 to fabricate the IC device 160. The IC manufacturer 150 is a IC fabrication business that can include a myriad of manufacturing facilities for the fabrication of a variety of different IC products. For example, there may be a manufacturing facility for the front end fabrication of a plurality of IC products (i.e., front-end-of-line (FEOL) fabrication), while a second manufacturing facility may provide the back end fabrication for the interconnection and packaging of the IC products (i.e., back-end-of-line (BEOL) fabrication), and a third manufacturing facility may provide other services for the foundry business. In the present embodiment, a semiconductor wafer is fabricated using the mask (or masks) to form the IC device 160. The semiconductor wafer includes a silicon substrate or other proper substrate having material layers formed thereon. Other proper substrate materials include another suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide. The semiconductor wafer may further include various doped regions, dielectric features, and multilevel interconnects (formed at subsequent manufacturing steps). The mask may be used in a variety of processes. For example, the mask may be used in an ion implantation process to form various doped regions in the semiconductor wafer, in an etching process to form various etching regions in the semiconductor wafer, in a deposition process (e.g., chemical vapor deposition (CVD) or physical vapor deposition (PVD)) to form a thin film in various regions on the semiconductor wafer, and/or other suitable processes.

Figure 2:
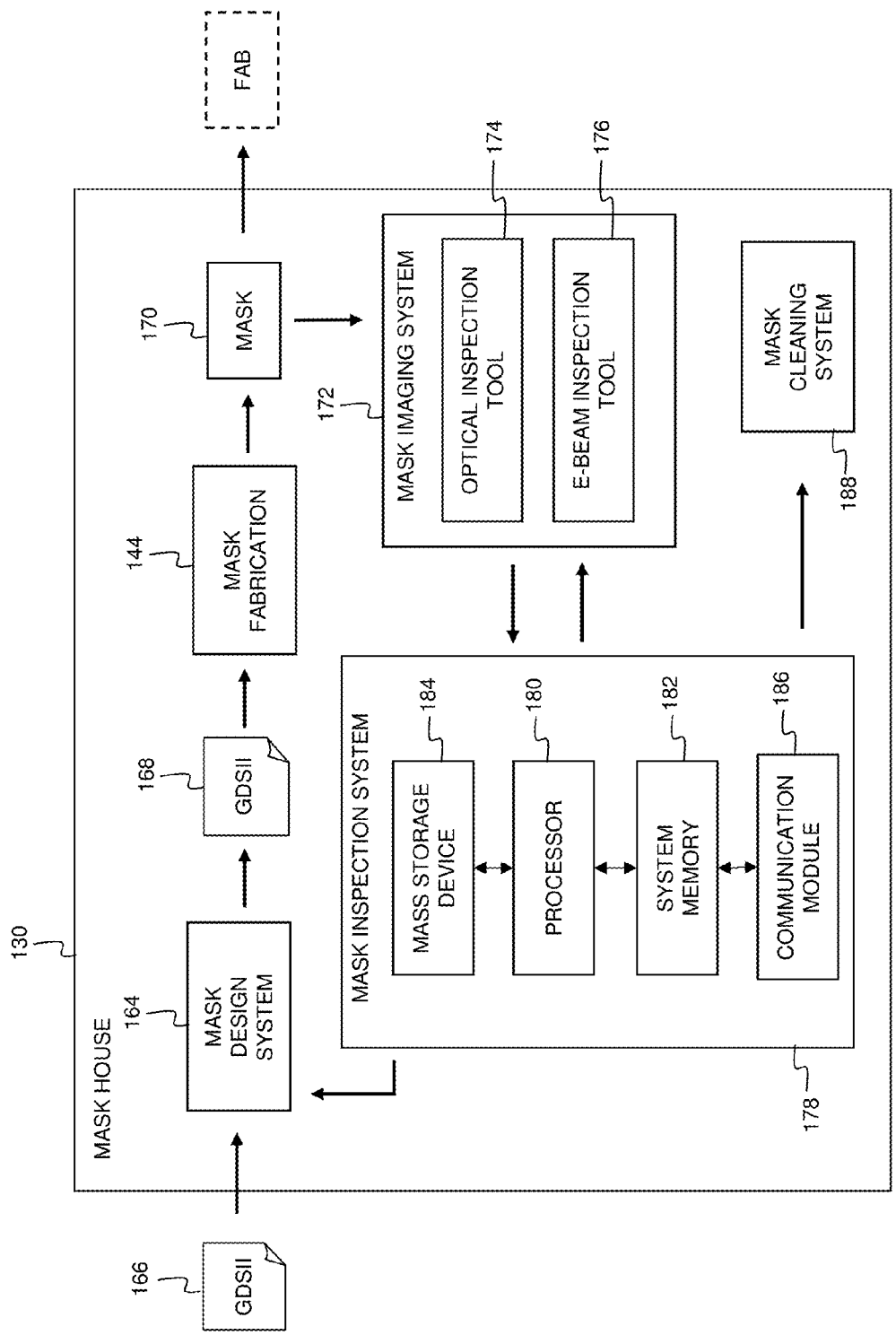
FIG. 2 is a more detailed block diagram of the mask house shown in FIG. 1 according to various aspects of the present disclosure.

FIG. 2 is a more detailed block diagram of the mask house 130 shown in FIG. 1 according to various aspects of the present disclosure. In the illustrated embodiment, the mask house 130 includes various systems that perform the functionality described in association with mask data preparation 132, mask fabrication 144, and mask inspection 146 of FIG. 1.

In more detail, the mask house 130 includes a mask design system 164 that is an information handling system such as a computer, server, workstation, or other suitable device. The mask design system 164 is configured to manipulate the IC design layout 122 according to a variety of design rules and limitations before it is transferred to a mask by mask fabrication 144. For example, in one embodiment, OPC and LPC may be implemented as software instructions executing on the mask design system 164. The mask design system 164 receives a first GDSII file 166 containing the IC design layout 122 from the design house 120. After the mask data preparation 132 is complete, the mask design system 164 transmits a second GDSII file 168 containing the a modified IC design layout to mask fabrication 144. In alternative embodiments, the IC design layout may be transmitted between the components in IC manufacturing system 100 in alternate file formats such as DFII, CIF, OASIS, or any other suitable file type. Mask fabrication 144 produces a mask 170.

The mask house 130 further includes a mask imaging system 172 that is operable to produce an image of the mask for inspection purposes. Further, the mask imaging system 172 is operable to scan photomasks at multiple resolutions and produce mask images at the multiple resolutions for inspection. For example, the mask imaging system 172 may include a higher resolution mode operable to produce detailed images of photomasks with patterns having a critical dimension of 20 nm and below, and also may include a lower resolution mode that is suited for imaging photomasks having 20 nm features and above. In the illustrated embodiment, the mask imaging system 172 includes both a optical inspection tool 174 and an electron-beam (e-beam) inspection tool 176, where the e-beam inspection tool is operable to image photomasks at a higher resolution than the optical inspection tool. Because the e-beam inspection tool (i.e., scanning electron microscope) is capable of higher resolution imaging than the optical inspection tool, it is better suited for discovering defects on photomasks having patterns with critical dimensions below 20 nm; however the e-beam inspection tool may be less efficient in scanning photomasks than the optical inspection tool, resulting in a longer mask inspection process. In one embodiment, the optical inspection tool 174 may carry out the lower resolution mode of the mask imaging system 172 and the electron-beam (e-beam) inspection tool 176 may carry out the higher resolution mode of the mask imaging system. However, in other embodiments, the mask imaging tool 172 may include different and/or additional inspection tools to scan photomask at various resolutions, such as a scanning probe microscope system, a laser microscope system, a transmission electron microscope system, a focus ion beam microscope system, or other suitable imaging tools.

The mask house 130 also includes a mask inspection system 178 configured to inspect images of the mask 170 produced by the mask imaging system 172. In the illustrated embodiment, the mask inspection system is an information handling system such as a computer, server, workstation, or other suitable device. The system 178 includes a processor 180 that is communicatively coupled to a system memory 182, a mass storage device 184, and a communication module 186. The system memory 182 provides the processor 180 with non-transitory, computer-readable storage to facilitate execution of computer instructions by the processor. Examples of system memory may include random access memory (RAM) devices such as dynamic RAM (DRAM), synchronous DRAM (SDRAM), solid state memory devices, and/or a variety of other memory devices known in the art. Computer programs, instructions, and data are stored on the mass storage device 184. Examples of mass storage devices may include hard discs, optical disks, magneto-optical discs, solid-state storage devices, and/or a variety other mass storage devices known in the art. The communication module 186 is operable to receive images from the mask imaging system 172 and communicate information such as defect information with the other components in the mask house 130. Examples of communication modules may include Ethernet cards, 802.11 WiFi devices, cellular data radios, and/or other suitable devices known in the art.

The mask inspection system 178 is configured to control the mask imaging system 172, and also to identify and classify a variety of defects on the surface of mask 170 as captured in the images produced by the mask imaging system 172. For instance, the mask inspection system 178 generally includes instructions to selectively utilize multiple imaging modes of the mask imaging system 172 so that a photomask may be inspected efficiently. More specifically, the mask inspection system 178 is configured to define critical regions of a pattern on a fabricated photomask and control the mask imaging system so that it scans the critical regions of the pattern with a higher resolution imaging mode, but scans the non-critical regions of the photomask with a lower resolution mode. For example, critical regions of a photomask may be imaged by the e-beam inspection tool 174. In the illustrated embodiment, a critical region may be defined as a region of a pattern in which defects are more likely to be formed, for example regions in which pattern elements are extremely close together. Photomask defect types may include bridging defects, half-etching defects, pin hole defects, residue defects, substrate damage defects, and particle defects. Various embodiments of methods of defining critical regions and utilizing different inspection resolutions are discussed in greater detail in association with FIGS. 3-12.

After the photomask 170 has been appropriately imaged by the mask imaging system 172, the mask inspection system is operable to identify various defects in the images of the photomask. Depending on the types of defects identified, the mask 170 may be sent to a mask cleaning system 188 before it is transported to the fab 150, or the mask may be discarded and the defect information may be relayed to the mask design system 164 so that the IC design layout may be adjusted. It is understood that the mask imaging system 172, the mask inspection system 178, and the mask house 130 may include additional and/or different components in alternative embodiments.

Figure 3:
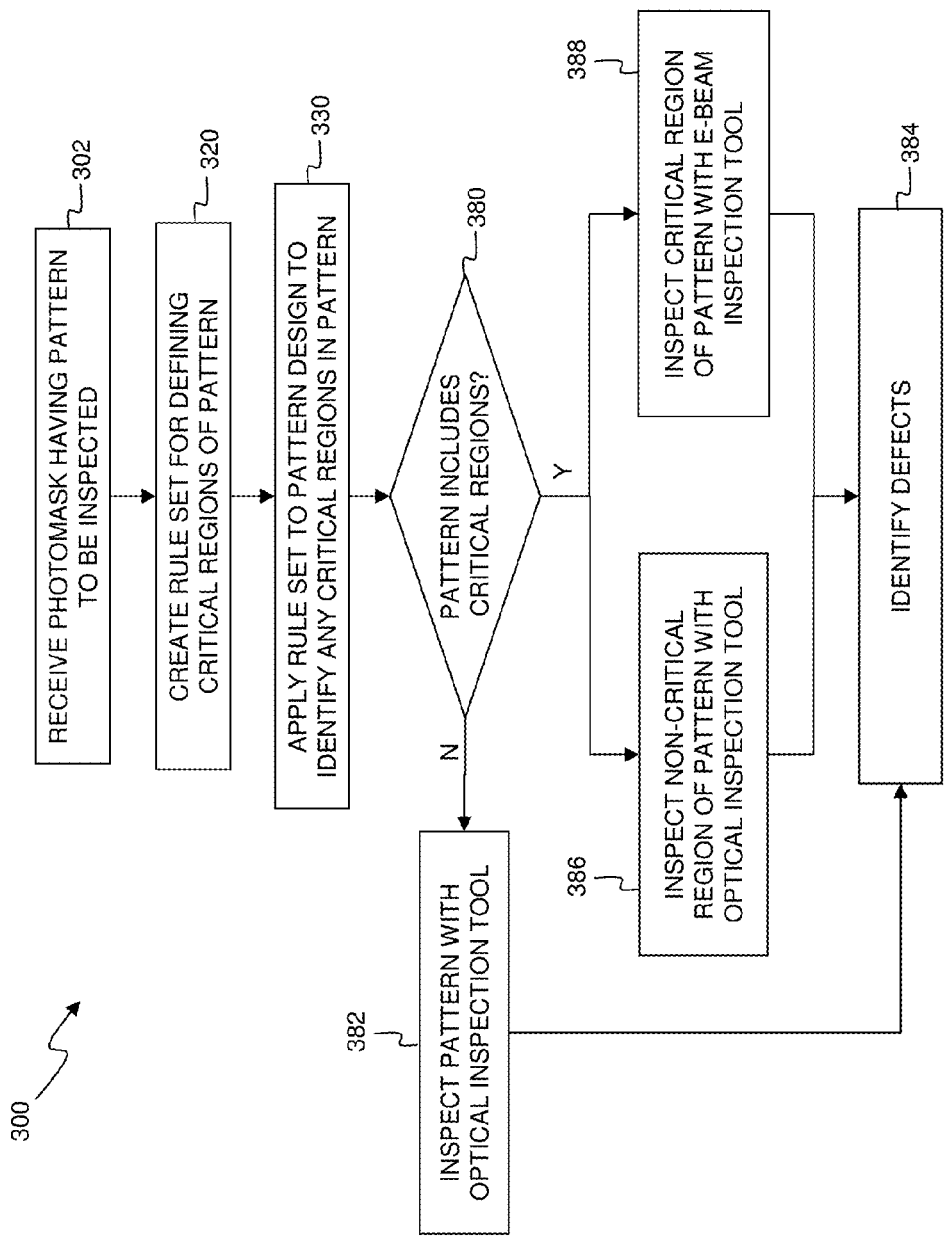
FIG. 3 is a high-level flowchart of a method of inspecting photomasks in an efficient manner using a pattern design according to various aspects of the present disclosure.

Referring now to FIG. 3, illustrated is a high-level flowchart of a method 300 of inspecting photomasks in an efficient manner using a pattern design according to various aspects of the present disclosure. In the illustrated embodiment, the method 300 is carried out by the mask imaging system 172 and mask inspection system 178 shown in FIG. 2. Further, in one embodiment, portions of the method 300 may be implemented as computer-readable instructions stored on the mass storage device 184 and executed by the processor 180 of the mask inspection system 178. In general, the method 300 identifies critical (i.e., defect prone) regions of a pattern that has been formed on a photomask using the pattern design on which the formed pattern was based. The method then inspects critical and non-critical areas with different resolution inspection tools to efficiently image the photomask. Further, the method 300 in FIG. 3 is a high-level overview and details associated with each block in the method will be described in association with the subsequent figures in the present disclosure.

Figure 4:
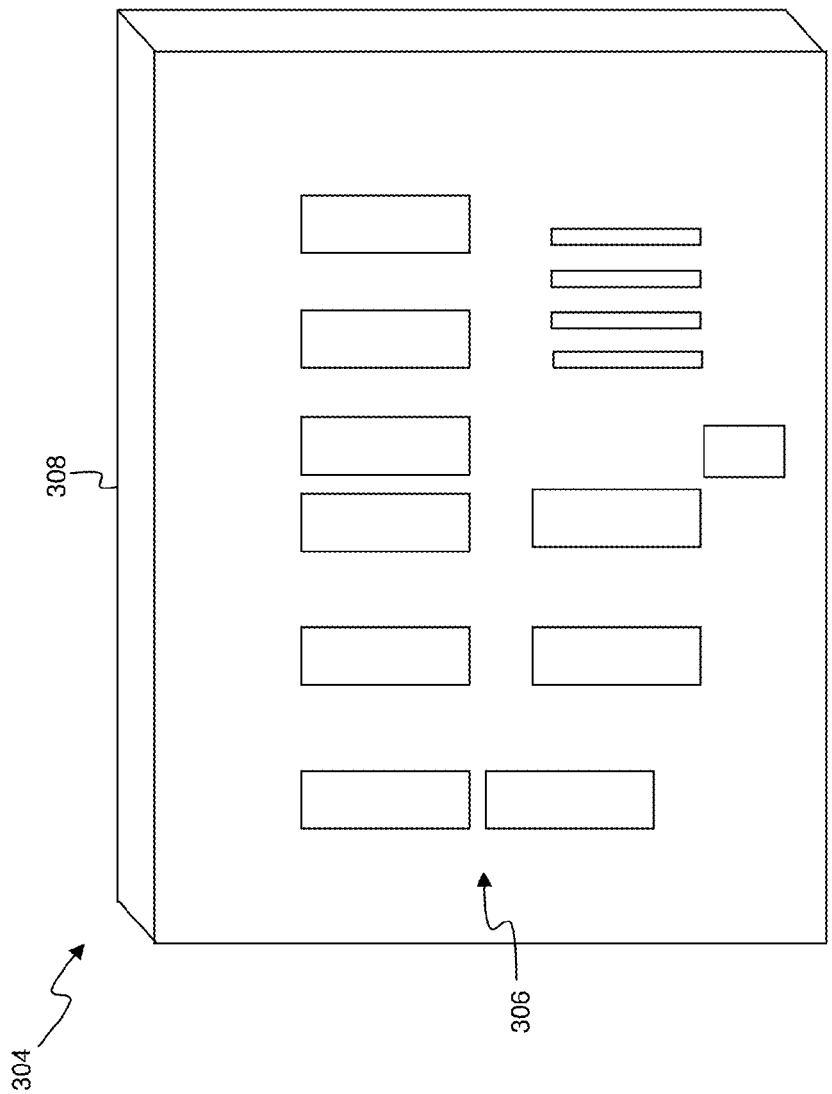
FIG. 4 illustrates an example photomask having a pattern formed thereon.

The method 300 of inspecting photomasks begins at block 302 where a photomask having a pattern formed thereon is received from a mask fabrication system. As discussed in association with FIG. 2, the mask fabrication system forms the pattern on the photomask based on a pattern design that is typically stored in an electronic file. In one embodiment, the pattern design is stored in a GDSII file. FIG. 4 illustrates an example photomask 304 having a pattern 306 formed thereon. The photomask 304 includes a substrate 308 and a plurality of fabricated pattern elements disposed on the substrate that form the pattern 306. Due to fabrication errors, the photomask may include various types of defects affecting the fabricated patterns elements and/or the substrate 308. The subsequent blocks in method 300 are directed toward identifying these defects in an efficient manner.

After a patterned photomask is received from the fabrication system, the method 300 continues to block 320 where a set of rules is created that defines what regions in the photomask pattern should be deemed a critical region. In the embodiment of method 300, the set of rules is defined in terms of the pattern design as represented in GDSII format. In the illustrated embodiment, the rules are based on the spacing of the pattern elements in the pattern design. In more detail, the set of rules may define a minimum pitch, a minimum distance between the edges of pattern elements disposed end-to-end, a minimum spacing between parallel pattern elements, and a minimum distance between corners of adjacent pattern elements. For example, a rule set may be created that defines a critical region as including pattern elements having any of the following characteristics: (1) a pitch of less than 80 nm, (2) end-to-end spacing of less than 20 nm, (3) edge-to-edge spacing of less than 30 nm, and (4) corner-to-corner spacing of less than 10 nm. It is understood that the above rules are simply examples, and any number of different rules may define critical regions in a photomask pattern design.

Figure 5:
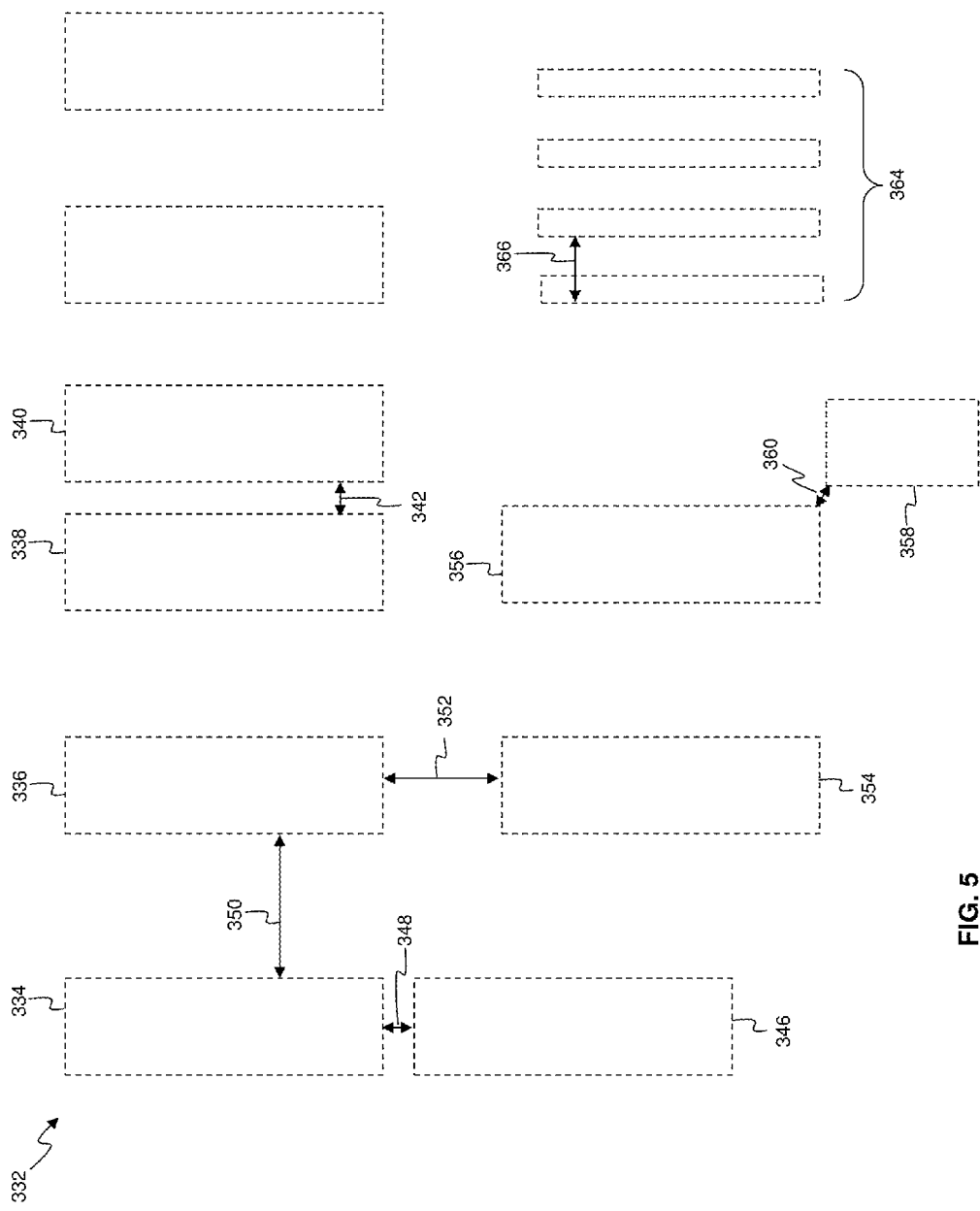
FIG. 5 illustrates an example pattern design upon which the pattern on the photomask of FIG. 4 is based.

After a set of rules are defined, the method 300 proceeds to block 330 where the rule set is applied to the pattern design upon which the pattern on photomask to be inspected was based. In the illustrated embodiment, the mask inspection system 178 of FIG. 2 includes instructions to apply the rule set to the pattern design. In an alternative embodiment, however, the mask imaging system 172 may be operable to apply the rule set. FIG. 5 illustrates an example pattern design 332 upon which the pattern on the fabricated photomask 304 is based. In the illustrated embodiment, the pattern design 332 is contained in the GDSII file 168 shown in FIG. 2. The pattern design 332 includes various pattern elements such as pattern elements 334, 336, 338, 340, 346, 354, 356, 358, and 364. As mentioned above, the rule set may be based on distances between various pattern elements in a pattern design. For illustration purposes, the example rule set defined above will applied to the pattern design 332 to define any critical regions in the pattern design.

Figure 6:
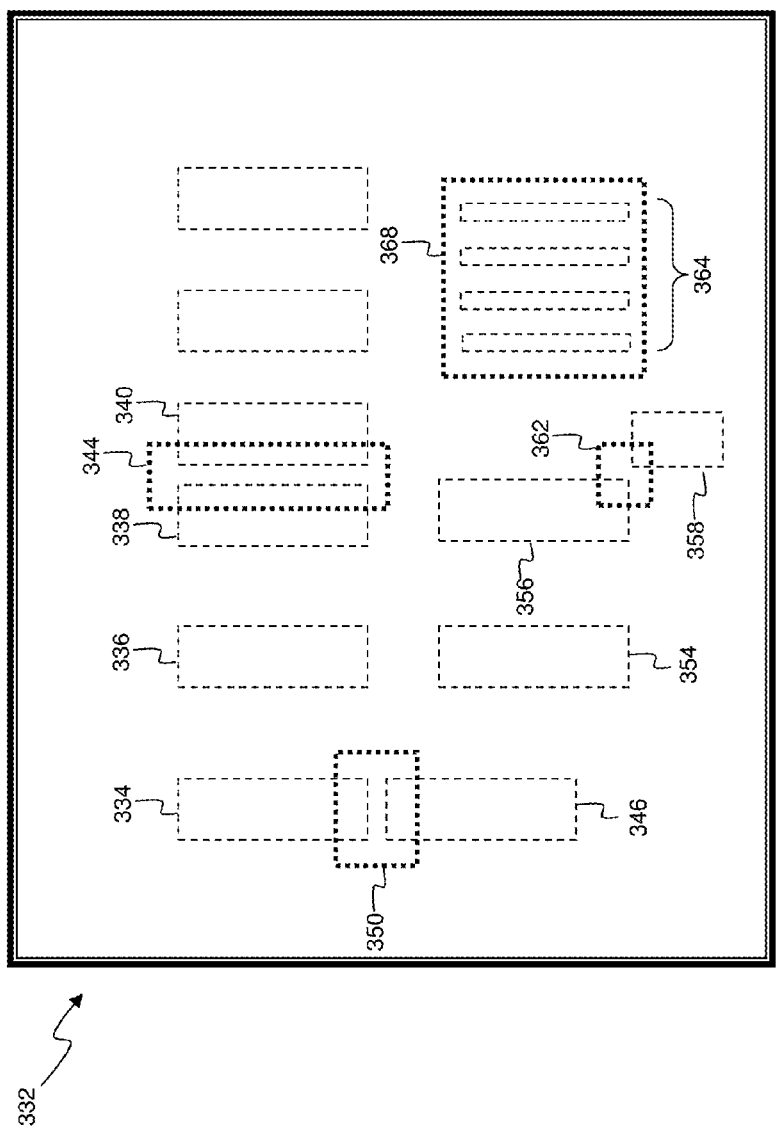
FIG. 6 illustrates another view of the pattern design of FIG. 5, and shows critical regions of the pattern design.

In the example of FIG. 5, the pattern element 334 and the pattern element 336 are separated by an edge-to-edge distance 337 of 60 nm. Applying the above edge-to-edge rule to the distance 337, the region between pattern elements 334 and 336 is not defined as a critical region because the distance 337 of 60 nm is larger than the threshold distance of 30 nm as defined by the rule. The pattern design 332 also includes parallel pattern elements 338 and 340 that are separated by an edge-to-edge distance 342 of 10 nm. Applying the same edge-to-edge rule to pattern elements 338 and 340, the distance 342 of 10 nm is smaller than the threshold distance of 30 nm as defined by the edge-to-edge rule. Thus, the region between the pattern elements 338 and 340 is defined as a critical region because defects are more likely to be formed between the closely spaced elements. In that regard, FIG. 6 illustrates another view of the pattern design 332 of FIG. 5, and shows a critical region 344 that encompasses the region between the pattern elements 338 and 340.

Referring back to FIG. 5, the pattern design 332 also includes a pattern element 346 that abuts an end of the pattern element 334. More specifically, the pattern elements 334 and 346 and separated by an end-to-end distance 348 of 15 nm. Applying the end-to-end spacing rule defined above to pattern elements 334 and 346, the distance 348 of 15 nm is smaller than the threshold distance of 20 nm as defined by the end-to-end rule. Accordingly, the region between the pattern elements 334 and 346 is defined as a critical region because the distance 348 is less then the threshold end-to-end spacing of 20 nm, and thus defects are more likely to be formed between the pattern elements 334 and 346. A second critical region 350 that encompasses the region between the pattern elements 334 and 346 is illustrated in FIG. 6. In contrast to the end-to-end spacing between the pattern elements 334 and 346, the pattern element 336 has a relatively larger end-to-end spacing 352 of 50 nm between an abutting pattern element 354. Thus, the distance 352 does not violate the end-to-end spacing rule of 10 nm, and thus the region between pattern elements 336 and 354 is defined as a non-critical region because it is less likely to include defects.

As a further example, the pattern design includes pattern elements 356 and 358 that are disposed in a corner-to-corner configuration with a distance 360 of 8 nm between them. The above defined corner-to-corner spacing rule establishes a minimum distance of 10 nm. Accordingly, the region between the pattern elements 356 and 358 is defined as a critical region because the distance 360 is less then the threshold pitch of 80 nm, and thus defects are more likely to be formed between the pattern elements 356 and 358. A third critical region 362 that encompasses the region between the pattern elements 356 and 358 is illustrated in FIG. 6.

As a final example, the pattern design 332 includes a pattern element array 364 that has a pitch 366 of 30 nm. The above-defined pitch rule establishes a minimum pitch of 80 nm. Accordingly, the region between the pattern elements 356 and 358 is defined as a critical region because the distance 360 is less then the threshold corner-to-corner spacing of 10 nm, and thus defects are more likely to be formed in association with the pattern element array 364. A fourth critical region 368 that encompasses the region encompassing the pattern element array 264 is illustrated in FIG. 6.

It is understood that the pattern design 332 and the rule set applied thereto are simply examples, and various other different and/or additional rules may be applied to pattern designs containing different and/or additional pattern elements. For example, the rule set may include rules defining critical regions based on other dimensions of pattern elements such as height or based on the presence of certain types of pattern elements in a region.

Referring back to FIG. 3, after applying the rule set of the pattern design to define any critical regions of the pattern on the photomask, the method 300 proceeds to decision block 380 where it is determined whether the pattern does in fact include critical regions. If it does not, method 300 continues to block 382 where the entire photomask is scanned in a lower resolution inspection mode. In the illustrated example, the entirety of photomask may be scanned by the optical inspection tool 174 to produce an image to be inspected for defects. As mentioned above, the inspection with the optical inspection tool 174 is more efficient than inspection with the e-beam inspection tool 176, and if a photomask does not include any critical regions (i.e., defect-prone regions), the higher resolution imaging of the e-beam inspection tool may be unnecessary. After a photomask has been imaged by the optical inspection tool, method 300 moves to block 384 where the resulting image is scrutinized for defects. In the illustrated embodiment, defect identification is performed by the mask inspection system 178.

If, however, it is determined at decision block 380 that a pattern of a photomask includes critical regions, the method 300 moves to blocks 386 and 388. In block 386, the non-critical portions of the pattern on the photomask are inspected in a lower resolution mode, for instance, by the optical inspection tool 174. However, in block 388, the critical regions of the pattern on the photomask—as determined in block 330—are inspected in a higher resolution mode. In the illustrated embodiment, higher resolution inspection of critical regions may be performed by the e-beam inspection tool 176. As mentioned above, the e-beam inspection tool is operable to image photomask patterns at a higher resolution than the optical inspection tool and is thus more likely to detect defects in regions of the pattern more likely to include defects (i.e., the critical regions). However, the e-beam inspection tool is less efficient than the optical inspection tool, and thus, by scanning only critical regions with the e-beam inspection tool, the overall photomask inspection process may be more efficient. After a photomask has been imaged by the optical and e-beam inspection tools, method 300 moves to block 384 where the resulting images are scrutinized for defects. In the illustrated embodiment, defect identification is performed by the mask inspection system 178.

It is understood that the method 300 of inspecting a photomask is simply an example embodiment, and in alternative embodiments, additional and/or different steps may be included in the method. Further, although the method 300 as described above is directed towards identifying defects on a photomask, the method 300 is equally applicable to other fabricated articles such as an integrated circuit on a semiconductor wafer. For instance, the method 300 may be employed to inspect an integrated circuit fabricated on a wafer by identifying critical regions of the circuit using a circuit design and imaging the critical regions in a higher resolution than the non-critical regions.

Figure 7:
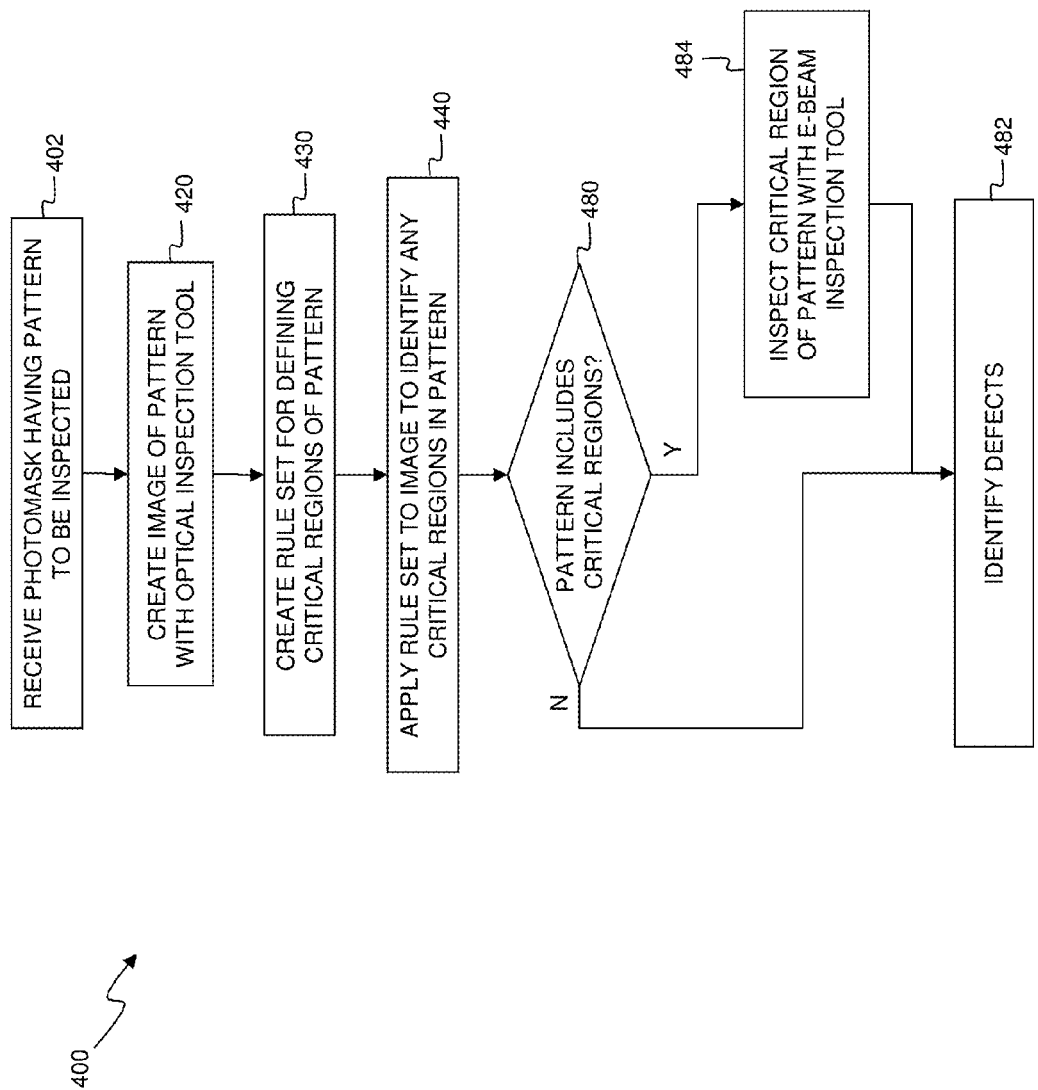
FIG. 7 is a high-level flowchart of a method of inspecting photomasks in an efficient manner using a two-step imaging flow according to various aspects of the present disclosure.

Referring now to FIG. 7, illustrated is a high-level flowchart of a method 400 of inspecting photomasks in an efficient manner using a two-step imaging flow according to various aspects of the present disclosure. In the illustrated embodiment, the method 400 is carried out by the mask imaging system 172 and mask inspection system 178 shown in FIG. 2. Further, in one embodiment, portions of the method 400 may be implemented as computer-readable instructions stored on the mass storage device 184 and executed by the processor

180 of the mask inspection system 178. In general, the method 400 identifies critical (i.e., defect-prone) regions of a pattern that has been formed on a photomask using an initial image of the pattern captured in a lower resolution mode. The method then inspects critical regions in a higher resolution mode to efficiently inspect the photomask. Further, the method 400 in FIG. 7 is a high-level overview and details associated with each block in the method will be described in association with the subsequent figures in the present disclosure.

Figure 8:
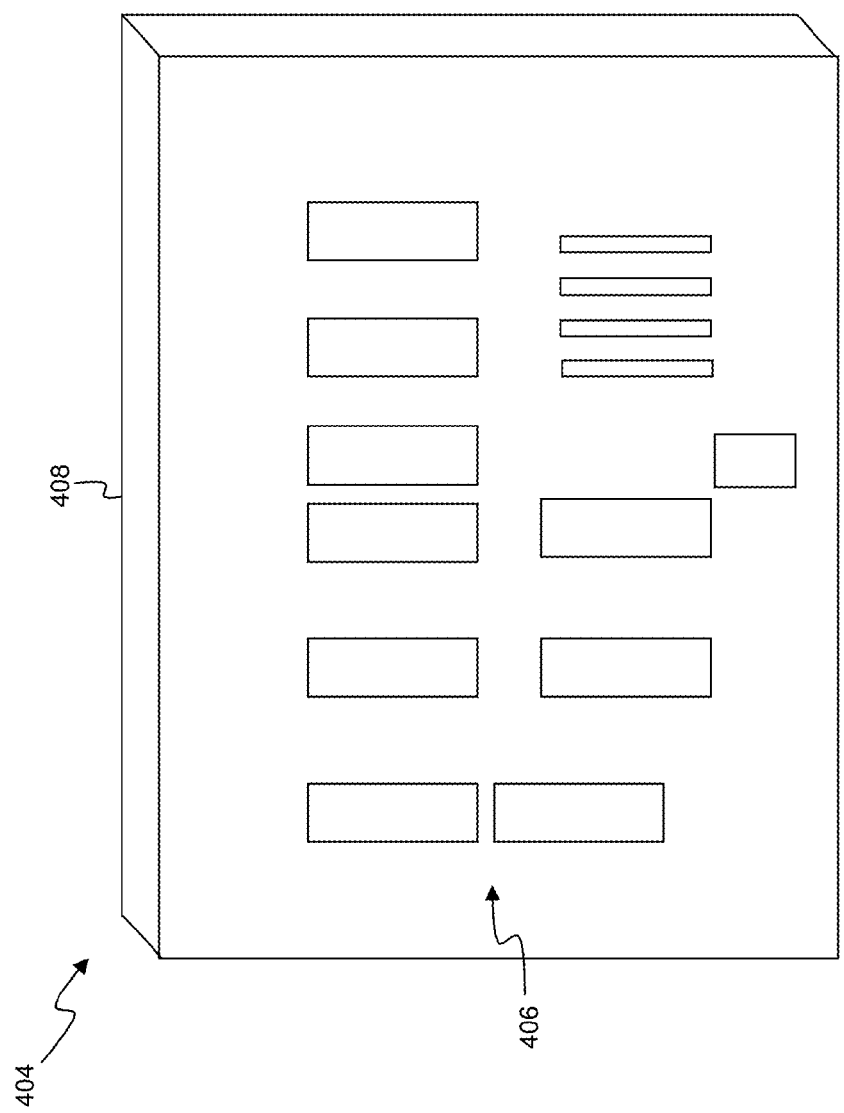
FIG. 8 illustrates an example photomask having a pattern formed thereon.

The method 400 of inspecting photomasks begins at block 402 where a photomask having a pattern formed thereon is received from a mask fabrication system. FIG. 8 illustrates an example photomask 404 having a pattern 406 formed thereon. The photomask 404 includes a substrate 408 and a plurality of fabricated pattern elements disposed on the substrate that form the pattern 406. Due to fabrication errors, the pattern 406 may include various types of defects affecting the fabricated patterns elements and/or the substrate 408. The subsequent blocks in method 400 are directed toward identifying these defects in an efficient manner.

Figure 9:
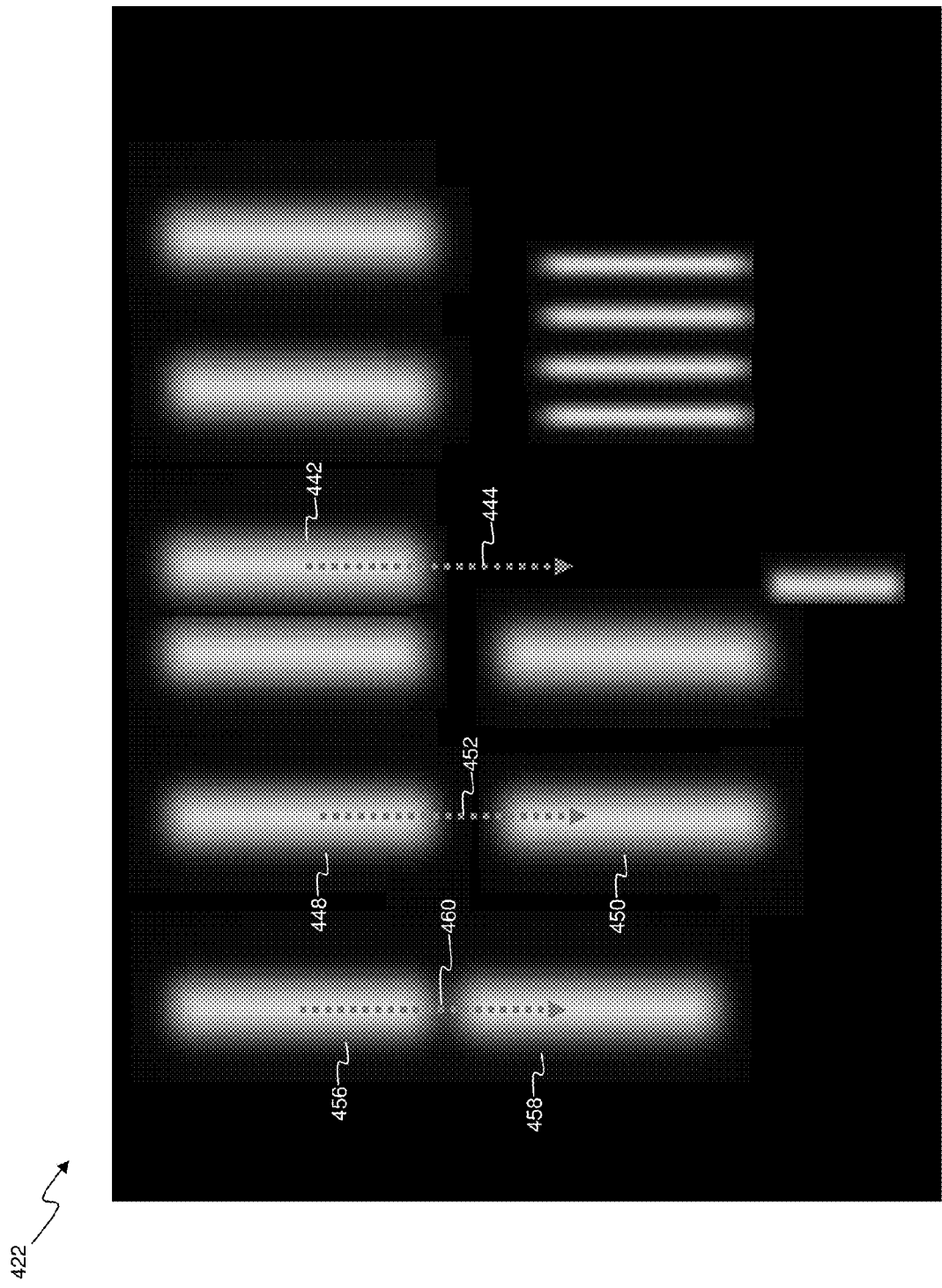
FIG. 9 is a gray scale image of the pattern on the photomask of FIG. 8.

Next, in block 420, the entire pattern on the photomask to be inspected is imaged in a lower resolution mode. In the illustrated embodiment, the pattern 406 on photomask 404 is scanned by the optical inspection tool 174 to produce an image of the pattern. In this regard, FIG. 9 is an example gray scale image 422 of the pattern 406 on the photomask 404. The image 422, in the illustrated embodiment, was produced by the optical inspection tool 174 and depicts the pattern elements in the pattern 406 as a lighter gray on a darker gray background. That is, different portions of the image 422 have different gray scale intensities. Further, because the optical inspection tool is operable to scan in a lower resolution mode, the initial image 422 is efficiently produced.

After an image of the pattern on the photomask to be inspected has been produced, the method 400 continues to block 430 where a set of rules is created that defines what regions in the photomask pattern should be deemed a critical region. In the embodiment of method 400, the set of rules is defined in terms of the pattern as represented by the gray scale image created in block 420, rather than the pattern design on which the photomask mask was based. In the illustrated embodiment, the rules define a minimum contrast between an image intensity value of a pattern element and an image intensity value of a region between the pattern element and an adjacent pattern element. As shown in FIG. 9, the edges of the pattern elements are represented by gray scale values that incrementally decrease, or, in other words, the pattern elements fade into the image background. Thus, if two pattern elements are in close enough proximity in the image, the gray scale values representing the region between them may not equal to the gray scale value of the nominal image background, or, in other words, the pattern elements may fade into each other. Therefore, a comparison of the gray scale value of the region between two pattern elements to the gray scale value of the pattern elements themselves yields information about the physical proximity of the pattern elements on the physical photomask under inspection. The rule set defines a critical region in terms of the contrast between the gray scale value of the region between two pattern elements to the gray scale value of the pattern elements. Specifically, in block 430, a minimum threshold contrast is defined. As an example, a rule may be created that sets the default contrast as the contrast between a single pattern element and the background and then defines a critical region as a region between pattern elements having a contrast with the pattern elements that is less than half of the default contrast. In alternative embodiments, the minimum threshold contrast may be defined by a different ratio or by a numerical gray scale value rather than by a ratio. It is understood that the above rules are simply examples, and any number of different rules may define critical regions in a photomask pattern design.

Figure 10:
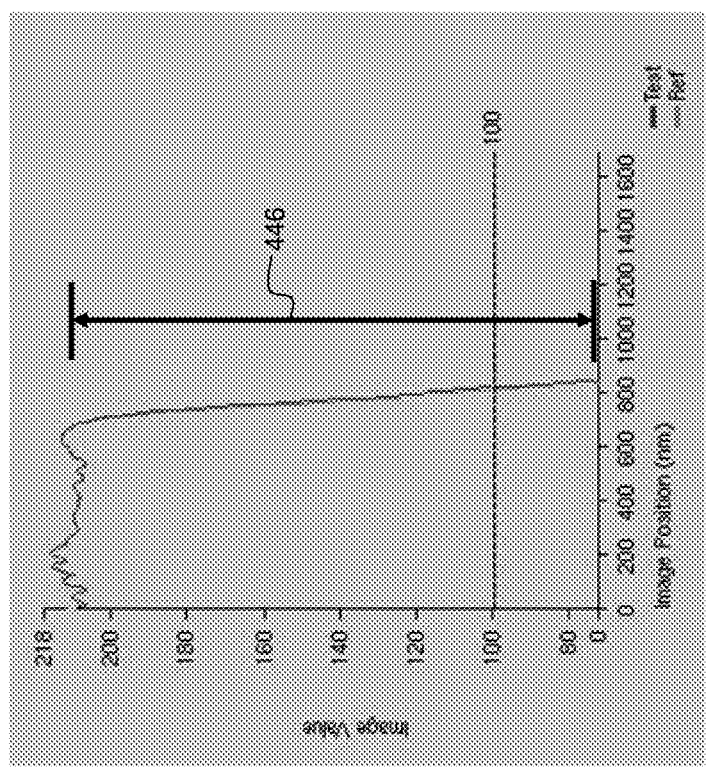
FIGS. 10-12 are example plots of the measured gray scale values in the gray scale image of FIG. 9.

After the rule set has been defined, the method 400 proceeds to block 440 where the rule set is applied to the low resolution image of the photomask created in block 420 to define the critical regions of the pattern 406. In the illustrated embodiment, the mask inspection system 178 may perform the application of the rule set to the initial image 422 created by the optical inspection tool 174. In that regard, referring back to FIG. 9, the image 422 includes a pattern element 442. In order to apply the rule set to the image 422, the mask inspection system will define a default contrast based on the contrast between the gray scale value representing the pattern element 442 and the gray scale value representing the image background (i.e., substrate portion of the photomask). To establish a default contrast, the mask inspection system 178, measures the gray scale values of the image 422 along the scan line 444 as shown in FIG. 9. In this regard, FIG. 10 is an example plot of the measured gray scale values along the scan line 444. As shown in FIG. 10, the pattern element 442 has an average gray scale value of approximately 210, and as the scan line moves into the substrate portion of the image, the gray scale values decrease until they reach 0. Thus, a contrast 446 between the gray scale values of the pattern element and the background is approximately 210. In the illustrated embodiment, this is set as the default (or large pattern) contrast and the rule set defines a region with a contrast less than half of contrast 446 (i.e., 110) as a critical region.

Figure 11:
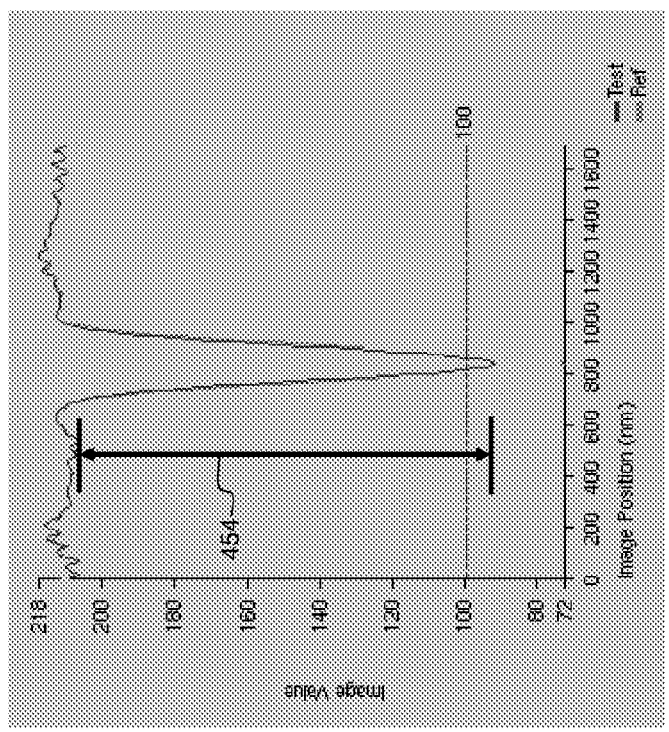

The method 400 then applies the rule set to two adjacent pattern elements in the image 422. For example, image 422 includes pattern elements 448 and 450 that are disposed in an end-to-end configuration on the substrate. The gray scale values of the pattern elements 448 and 450 and the region therebetween are measured along the scan line 452. In that regard, FIG. 11 is an example plot of the measured gray scale values along the scan line 452. As with the pattern element 442, the pattern elements 448 and 450 are represented by gray scale values of approximately 210. As the scan line 452 moves across the region between the pattern elements 448 and 450, the gray scale values decrease to about 95 (but not all the way to zero) before returning to approximately 210. Thus, a contrast 454 between the gray scale values of the pattern elements and the region therebetween is approximately 115. Applying the example half-contrast rule defined in block 430, the region between the pattern elements 448 and 450 would not be a critical region between its contrast 454 with the pattern elements of 115 is not less than half of the default contrast 446 of 110.

Figure 12:
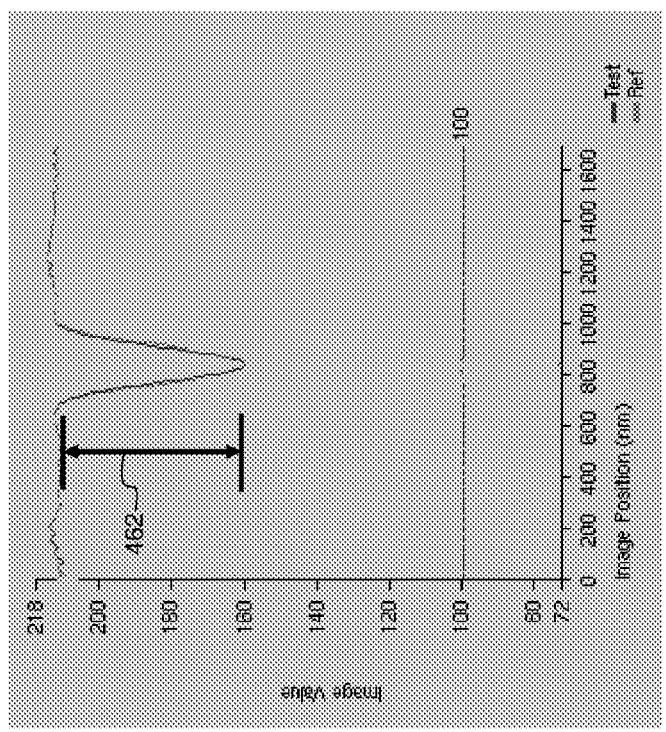

The image 422 also includes pattern elements 456 and 458 that are disposed in an end-to-end configuration on the substrate. The gray scale values of the pattern elements 456 and 458 and the region therebetween are measured along the scan line 460. In that regard, FIG. 12 is an example plot of the measured gray scale values along the scan line 460. As with the pattern element 442, the pattern elements 456 and 458 are represented by gray scale values of approximately 210. As the scan line 452 moves across the region between the pattern elements 456 and 458, the gray scale values decrease to about 160 before returning to approximately 210. Thus, a contrast 462 between the gray scale values of the pattern elements and the region therebetween is approximately 50. Applying the example half-contrast rule defined in block 430, the region between the pattern elements 456 and 458 would be a critical region because its contrast 462 with the pattern elements of 60 is less than half of the default contrast 446 of 110. The remainder of the regions between pattern elements in the image 422 may be checked against the half-contrast rule in a similar manner to identify other critical regions in which defects might be disposed.

Referring back to FIG. 7, after applying the rule set to the lower resolution image 422 to define any critical regions of the pattern on the photomask, the method 400 proceeds to decision block 480 where it is determined whether the pattern does in fact include critical regions. If it does not, method 400 continues to block 482 where the image 422 is scrutinized for defects. In the illustrated embodiment, defect identification is performed by the mask inspection system 178.

If, however, it is determined at decision block 480 that a pattern of a photomask includes critical regions, the method 400 moves to block 484. In block 484, the critical regions of the pattern on the photomask—as determined in block 440—are inspected in a higher resolution mode. In the illustrated embodiment, higher resolution inspection of critical regions may be performed by the e-beam inspection tool 176. As mentioned above, the e-beam inspection tool is operable to image photomask patterns at a higher resolution than the optical inspection tool and is thus are more likely to detect defects in regions of the pattern more likely to include defects (i.e., the critical regions). However, the e-beam inspection tool is less efficient than the optical inspection tool, thus, by scanning only critical regions with the e-beam inspection tool, the duration of the overall photomask inspection process may be improved. After the critical regions of the photomask have been imaged by the e-beam inspection tool, method 400 moves to block 482 where the images of the non-critical regions generated by the optical inspection tool and the images of the critical regions generated by the e-beam inspection tool each are scrutinized for defects. In the illustrated embodiment, defect identification is performed by the mask inspection system 178.

It is understood that method 400 of inspecting a photomask is simply an example embodiment, and in alternative embodiments, additional and/or different steps may be included in the method. Further, although the method 400 as described above is directed towards identifying defects on a photomask, the method 400 is equally applicable to other fabricated articles such as an integrated circuit on a semiconductor wafer. For instance, the method 400 may be employed to inspect an integrated circuit fabricated on a wafer by identifying critical regions of the circuit on an initial lower resolution image and inspecting the critical regions in a higher resolution.

Further, the methods 300 and 400 of inspecting fabricated articles of the illustrated embodiments are designed to be executed on any computing architecture, such as the systems described in association with mask house 130 of FIG. 2. For example, portions of the methods 300 and 400 may be executed on a single computer, local area networks, client-server networks, wide area networks, internets, hand-held and other portable and wireless devices and networks. Such architecture can take the form of an entirely hardware embodiment, an entirely software embodiment, or an embodiment containing both hardware and software elements. Hardware generally includes at least processor-capable platforms, such as client-machines (also known as personal computers or servers), and hand-held processing devices (such as smart phones, personal digital assistants (PDAs), or personal computing devices (PCDs), for example. Hardware can include any physical device that is capable of storing machine-readable instructions, such as memory or other data storage devices. Other forms of hardware include hardware sub-systems, including transfer devices such as modems, modem cards, ports, and port cards, for example. Software generally includes any machine code stored in any memory medium, such as RAM or ROM, and machine code stored on other devices (such as floppy disks, flash memory, or a CDROM, for example). Software can include source or object code, for example. In addition, software encompasses any set of instructions capable of being executed in a client machine or server.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, a semiconductor system (or apparatus or device), or a propagation medium.

Data structures are defined organizations of data that may enable an embodiment of the present disclosure. For example, a data structure may provide an organization of data, or an organization of executable code. Data signals could be carried across transmission mediums and store and transport various data structures, and, thus, may be used to transport an embodiment of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

In one exemplary aspect, the present disclosure is directed to a method of inspecting fabricated articles. The method includes receiving a fabricated article to be inspected for defects, the fabricated article having a pattern thereon, and the pattern being based on a pattern design and creating a rule set for defining critical regions of the pattern as represented in the pattern design, the critical regions being regions in which defects are more likely to be found during inspection. The method also includes applying the rule set to the pattern design to identify a critical region of the pattern on the fabricated article and a non-critical region of the pattern on the fabricated article. Further, the method includes inspecting the non-critical region of the pattern on the fabricated article for defects at first resolution and inspecting the critical region of the pattern on the fabricated article for defects at a second resolution higher than the first resolution.

In another exemplary aspect, the present disclosure is directed to a method of inspecting fabricated articles. The method includes receiving a fabricated article to be inspected for defects, the fabricated article having a pattern thereon and scanning the fabricated article at a first resolution to create an image of the pattern. The method also includes creating a rule set for defining critical regions of the pattern as represented on the image, the critical regions being regions in which defects are more likely to be found during inspection and applying the rule set to the image of the pattern to define a critical region of the pattern on the fabricated article. Further, the method includes inspecting the critical region of the pattern on the fabricated article for defects at a second resolution higher than the first resolution.

In yet another exemplary aspect, the present disclosure is directed to a defect inspection system. The system includes an imaging system operable to create an image of a fabricated article having a pattern thereon, the imaging system operable to create the image using one of a first resolution and a second resolution higher than the first resolution, and the pattern being based on a pattern design and a processor. The system also includes a communication module communicatively coupled to the processor and configured to receive images of the fabricated article from the imaging system and a non-transitory, computer-readable storage communicatively coupled to the processor and including instructions executable by the processor. The instructions include instructions to create a rule set for defining critical regions of the pattern as represented in the pattern design, the critical regions being regions in which defects are more likely to be found during inspection and instructions to apply the rule set to the pattern design to identify a critical region of the pattern on the fabricated article and a non-critical region of the pattern on the fabricated article. The instructions also include instructions to control the imaging system to image the non-critical region of the pattern on the fabricated article at the first resolution and instructions to control the imaging system to image the critical region of the pattern on the fabricated article for defects at the second resolution.

What is claimed is:

1. A method of inspecting fabricated articles, comprising:
receiving a fabricated article to be inspected for defects, the fabricated article having a pattern thereon, and the pattern being based on a pattern design;
creating a rule set for defining critical regions of the pattern as represented in the pattern design, the critical regions being defined by the rule set as regions in which a respective pattern element spacing of the pattern design indicates defects are more likely to be found during inspection;
applying the rule set to the pattern design to identify a critical region of the pattern on the fabricated article and a non-critical region of the pattern on the fabricated article;
inspecting the non-critical region of the pattern on the fabricated article for defects at first resolution;
inspecting the critical region of the pattern on the fabricated article for defects at a second resolution higher than the first resolution; wherein the rule set defines at least one of the critical regions based on the respective pattern element spacing violating a minimum threshold distance between two pattern elements in the pattern design; and
wherein applying the rule set to the
pattern design includes:
comparing the minimum threshold distance to a distance between two pattern elements in the pattern design; and
identifying, as the critical region, the region between the two pattern elements if the two pattern elements are spaced apart a distance less than the minimum threshold distance.

2. The method of claim 1, wherein the inspecting the non-critical region and inspecting the critical region are performed with different imaging tools.

3. The method of claim 2,
wherein the inspecting the non-critical region is performed with an optical inspection tool; and
wherein the inspecting the critical region is performed with an electron-beam inspection tool.

4. The method of claim 1, wherein the minimum threshold distance between two pattern elements in the pattern design includes at least one of a minimum pitch of the two pattern elements, a minimum distance between edges o pattern elements end-to-end, a minimum spacing between edges of parallel pattern elements, or a minimum distance between corners of adjacent pattern elements.

5. The method of claim 1, wherein inspecting the non-critical region of the pattern includes creating an image of the non-critical region with an optical inspection tool and identifying defects depicted in the image.

6. The method of claim 1, wherein inspecting the critical region of the pattern includes creating an image of the critical region with an e-beam inspection tool and identifying defects depicted in the image.

7. The method of claim I, wherein the pattern design is represented in GDSII format.

8. A method of inspecting fabricated articles, comprising:
receiving a fabricated article to be inspected for defects, the fabricated article having a pattern thereon;
scanning the fabricated article at a first resolution to create an image of the pattern;
creating a rule set for defining critical regions of the pattern as represented on the image, such that the rule set defines the critical regions as being regions in which a contrast between a pattern element and a background element in the image indicates defects are more likely to be found during inspection;
applying the rule set to the image of the pattern to define a critical region of the pattern on the fabricated article;
inspecting the critical region of the pattern on the fabricated article for defects at a second resolution higher than the first resolution;
wherein creating the rule set includes defining a minimum contrast between an image intensity value representing the pattern element in the image and an image intensity value representing a region between the pattern element and an adjacent pattern element in the image; and
wherein defining the minimum contrast includes;
determining a default contrast between an image intensity value representing a pattern element and an image intensity value representing an image background; and
defining, as a critical region, a region between pattern elements represented by an image intensity value having a contrast with the image intensity value representing the pattern element that is less than the minimum contrast.

9. The method of claim 8, wherein the scanning the fabricated article at the first resolution and the inspecting the critical region of the pattern are performed with different imaging tools.

10. The method of claim 9,
wherein the scanning the fabricated article at the first resolution is performed with an optical inspecting tool; and
wherein the inspecting the critical region of the pattern is performed with an electron-beam inspecting tool.

11. The method of claim 8, wherein the image is a gray scale image and the image intensity value representing the pattern element is a gray scale value.

12. A defect inspection system, comprising:
an imaging system operable to create an image of a fabricated article having a pattern thereon, the imaging system operable to create the image using one of a first resolution and a second resolution higher than the first resolution, and the pattern being based on a pattern design; a processor;

a communication module communicatively coupled to the processor and configured to receive images of the fabricated article from the imaging system; and a non-transitory, computer-readable storage communicatively coupled to the processor and including instructions executable by the processor, the instructions including;

instructions to create a rule set for defining critical regions of the pattern as represented in the pattern design, the critical regions being defined as regions in which a pattern element spacing indicates defects are more likely to be found during inspection;

instructions to apply the rule set to the pattern design to identify a critical region of the pattern on the fabricated article and a non-critical region of the pattern on the fabricated article;

instructions to control the imaging system to image the non-critical region of the pattern on the fabricated article at the first resolution;

instructions to control the imaging system to image the critical region of the pattern on the fabricated article for defects at the second resolution; wherein the instructions to create a rule set includes instructions to define a minimum threshold distance between two pattern elements in the pattern design; and wherein the instructions to define the minimum threshold distance between two pattern elements in the pattern design includes at least one of instructions to define a minimum pitch of the two pattern elements, instructions to define a minimum distance between edges of pattern elements disposed end-to-end, instructions to define a minimum spacing between edges of parallel pattern elements, and instructions to define a minimum distance between corners of adjacent pattern elements.

13. The defect inspection system of claim 12,
wherein the imaging system includes a optical inspection tool operable to create the image using the first resolution; and
wherein the imaging system includes an e-beam inspection tool operable to create the image using the second resolution.

14. The defect inspection system of claim 12, wherein the instructions to apply the rule set to the pattern design include:
instructions to compare the minimum threshold distance to a distance between two pattern elements in the pattern design; and
instructions to identify, as the critical region, the region between the two pattern elements if the two pattern elements are spaced apart a distance less then the minimum threshold distance.

* * * * *